US012799343B2

(12) United States Patent
Nishijima et al.

(10) Patent No.: US 12,799,343 B2
(45) Date of Patent: Nov. 17, 2026

(54) PIGMENT DISPERSION FOR INKJET INK, INKJET INK, AND PRINTED PRODUCT

(71) Applicant: DIC Corporation, Tokyo (JP)

(72) Inventors: Takashi Nishijima, Sakura (JP); Iwao Hattori, Sakura (JP); Minoru Shigemori, Sakura (JP); Naruhito Suzuki, Sakura (JP)

(73) Assignee: DIC CORPORATION, Tokyo (JP)

( * ) Notice: Subject to any disclaimer, the term of this patent is extended or adjusted under 35 U.S.C. 154(b) by 552 days.

(21) Appl. No.: 18/279,966

(22) PCT Filed: Mar. 31, 2022

(86) PCT No.: PCT/JP2022/016449

§ 371 (c)(1), (2) Date: Sep. 1, 2023

(87) PCT Pub. No.: WO2022/220149

PCT Pub. Date: Oct. 20, 2022

(65) Prior Publication Data

US 2024/0158656 A1 May 16, 2024

(30) Foreign Application Priority Data

Apr. 13, 2021 (JP) ................................. 2021-067630

(51) Int. Cl.

| | |
|---|---|
| ***C09D 11/326*** | (2014.01) |
| ***B41J 3/407*** | (2006.01) |
| ***C09C 3/10*** | (2006.01) |
| ***C09D 17/00*** | (2006.01) |

(52) U.S. Cl.

CPC ............. *C09D 11/326* (2013.01); *B41J 3/407* (2013.01); *C09C 3/10* (2013.01); *C09D 17/00* (2013.01)

(58) Field of Classification Search

CPC ........ C09D 11/326; C09D 17/00; B41J 3/407; C09C 3/10

See application file for complete search history.

(56) References Cited

U.S. PATENT DOCUMENTS

| | | | | |
|---|---|---|---|---|
| 2002/0075369 | A1 | 6/2002 | Ota et al. | |
| 2004/0020407 | A1 | 2/2004 | Kato | |
| 2010/0227065 | A1* | 9/2010 | Yanagi .................. | C09D 11/38 524/378 |
| 2011/0187789 | A1* | 8/2011 | Saito .................... | C09D 11/107 347/100 |
| 2011/0281988 | A1* | 11/2011 | Tanoue ................ | C09D 11/324 524/386 |

FOREIGN PATENT DOCUMENTS

| | | | |
|---|---|---|---|
| JP | 8-218013 | A | 8/1996 |
| JP | 8-311383 | A | 11/1996 |
| JP | 2002-020673 | A | 1/2002 |
| JP | 2003-213180 | A | 7/2003 |
| JP | 2006-274023 | A | 10/2006 |
| JP | 2009-144060 | A | 7/2009 |
| JP | 2015-063582 | A | 4/2015 |
| JP | 2019-19315 | A | 2/2019 |
| JP | 2019-196423 | A | 11/2019 |
| WO | 2020/012158 | A1 | 1/2020 |

OTHER PUBLICATIONS

International Search Report dated Jun. 14, 2022, issued in counterpart International Application No. PCT/JP2022/016449 (2 pages).

Notice of Reasons for Refusal dated Nov. 29, 2022, issued in counterpart JP Patent Application No. 2022-562514, w/English translation (5 pages).

* cited by examiner

*Primary Examiner* — John E Uselding

(74) *Attorney, Agent, or Firm* — WHDA, LLP

(57) ABSTRACT

The present invention relates to a pigment dispersion for inkjet containing a dispersant (A), a pigment (B), and water (C), the dispersant (A) containing a non-cross-linked resin (A1) at least having a structural unit (a1) derived from an acid group-containing monomer, in the resin (A1), the acid groups in the structural unit (a1) being neutralized using a tertiary alkanolamine with a neutralization rate of greater than 100% and 200% or less with a neutralization rate when the acid groups are neutralized with a theoretical equivalent as 100%, and the tertiary alkanolamine having two to three hydroxy groups in a structure and having a boiling point of 150 to 330 °C, and also relates to an inkjet ink containing the pigment dispersion for inkjet and a printed product printed with the inkjet ink.

6 Claims, No Drawings

PIGMENT DISPERSION FOR INKJET INK, INKJET INK, AND PRINTED PRODUCT

TECHNICAL FIELD

The present invention relates to a pigment dispersion for use in aqueous inkjet ink applications, an aqueous inkjet ink prepared using the pigment dispersion, and a printed product inkjet-printed using the inkjet ink.

BACKGROUND ART

In addition to the viewpoint of sustainability against the background of global escalation of worsening of atmospheric pollution by volatile organic compounds (VOCs), global warning, and the like, out of concerns about working safety and sanitation and flashing explosiveness, there is a move of conversion to oil-free resources, and restrictions on the use of organic solvents are becoming stricter. Given these circumstances, in the printing ink industry, aqueous inks, in which organic solvents in solvent type printing inks have been replaced with water, have been developed, and in inkjet inks too, development of and improvement in aqueous inks are demanded.

Meanwhile, due to increases in population, increases in income levels, and changes in logistics systems, package consumption of plastic films tends to increase worldwide, and along with this trend, the production of inks for packaging is increasing year by year.

Conventionally, solvent type flexographic inks and solvent type gravure inks have been the mainstream in printing on film base materials. However, there has been a problem in that these methods of printing require plate making, thus increasing costs and taking time until printing. Thus, in film package printing too, demand for inkjet printing, which eliminates plate making and enables on-demand printing, has been increasing. There is also a growing demand for on-demand printing on film base materials other than packaging applications, such as film printing in sign display applications used indoors and outdoors.

However, there has been a problem in that aqueous inkjet inks are still insufficient in abrasion resistance compared to solvent type inkjet inks. In printing on film base materials, back printing, in which printing is performed on the back face of film base materials, is the mainstream, but front printing, in which printing is performed on the front face of film base materials is faster in printing and processing, and thus front printing is more advantageous when importance is attached to productivity and costs. However, in front printing, a printing face comes into contact with an external environment without intervening base materials, and thus high abrasion resistance is required for the printing face and inks themselves. Inkjet inks also having abrasion resistance can be used not only for film back printing but also front printing, thus increasing versatility, and thus inkjet inks having excellent abrasion resistance are being demanded.

Meanwhile, attempts to improve abrasion resistance have been made in aqueous inkjet inks, but there is concern that the resulting flocculates reduce filterability and ink ejection properties. Ink ejection reliability, which is an issue unique to inkjet printing, is caused by the occurrence of nozzle clogging failure caused by drying of the ink at an inkjet head ejection part during the time when the ink is not ejected during inkjet printing (an open time). For inks for inkjet, excellent ink resolubility enabling a reduction in the occurrence of this nozzle clogging is demanded.

CITATION LIST

Patent Literature

PTL 1: Japanese Unexamined Patent Application Publication No. 2019-196423

SUMMARY OF INVENTION

Technical Problem

PTL 1 discloses an inkjet ink having excellent water resistance and alcohol resistance and enabling film printing, and the ink is characterized by the acid value of a dispersant being ammonia-neutralized and a resin emulsion having a specific Tg and acid value. PTL 1 evaluates solvent resistance by abrasion with a cotton swab wetted with a solvent, and it is understood that the configuration of PTL 1 provides a certain degree of abrasion properties. However, PTL 1 does not evaluate filterability and resolubility and does not evaluate abrasion resistance during drying either, and thus further improvement is demanded also in abrasion resistance.

In addition, in the invention described in PTL 1, ammonia is used for neutralization, and thus there has also been a problem of odors occurring during production and odors remaining in the composition itself. Further, ammonia is highly volatile, and thus there is also a problem in that ammonia used for neutralization volatilizes, which can cause nozzle clogging.

An object of the present invention is to provide an inkjet ink having favorable abrasion resistance when being printed on various types of base materials such as plastic base materials, having excellent filterability and ink ejection properties during inkjet printing, and producing no odors during production and the like, a pigment dispersion for inkjet that can be used for the inkjet ink, and a printed product inkjet-printed with the inkjet ink.

Solution to Problem

The inventors of the present invention have conducted earnest study in order to achieve the above object to find that the object can be achieved by neutralizing part or all of acid groups in a dispersant resin with a specific tertiary alkanolamine and further by a pigment dispersion containing a non-cross-linked resin as a dispersant and have completed the present invention.

Specifically, the present invention relates to the following inventions.

(1) A pigment dispersion for inkjet containing a dispersant (A), a pigment (B), and water (C), the dispersant (A) containing a non-cross-linked resin (A1) at least having a structural unit (a1) derived from an acid group-containing monomer, in the resin (A1), the acid groups in the structural unit (a1) being neutralized using a tertiary alkanolamine with a neutralization rate of greater than 100% and 200% or less with a neutralization rate when the acid groups are neutralized with a theoretical equivalent as 100%, and the tertiary alkanolamine having two to three hydroxy groups in a structure and having a boiling point of 150 to 330 °C.

(2) The pigment dispersion for inkjet according to (1), in which the resin (A1) has an acid value of 80 to 225 mgKOH/g.
(3) The pigment dispersion for inkjet according to (1) or (2), further containing a binder (D).
(4) The pigment dispersion for inkjet according to any one of (1) to (3), in which the pigment dispersion for inkjet is for printing on a plastic base material.
(5) An inkjet ink containing the pigment dispersion for inkjet according to any one of (1) to (4).
(6) A printed product printed with the inkjet ink according to (5).

Advantageous Effects of Invention

The present invention can produce an aqueous inkjet ink having favorable abrasion properties even when being used for plastic base materials and the like, having excellent filterability and ink ejection properties during inkjet printing, and producing no odors during production and the like.

DESCRIPTION OF EMBODIMENTS

[Pigment Dispersion for Inkjet]

The "pigment dispersion for inkjet" of the present invention (hereinafter, may be referred to simply as a "pigment dispersion" or a "dispersion") contains a dispersant (A), a pigment (B), and water (C) and is used for the preparation of an inkjet ink. In the following, the "pigment (A)" may be referred to as a "component (A)" and the other components may be referred to in the same manner.

The pigment dispersion of the present invention is produced as an intermediate product for the inkjet ink and is used for inkjet printing as an aqueous inkjet ink after dilution.

<Dispersant (A)>

The dispersant (A) contains a non-cross-linked resin (A1), and the resin (A1) at least has a structural unit (a1) derived from an acid group-containing monomer. In the dispersant (A), the acid group in the structural unit (a1) is neutralized by a tertiary alkanolamine.

(Resin (A1))

The resin (A1) is a non-cross-linked resin having the structural unit (a1) derived from an acid group-containing monomer and a structural unit (a2) other than (a1) and is obtained by polymerizing an acid group-containing monomer and another monomer using a known method such as radical polymerization in the presence of any polymerization initiator. The resin (A1) having the acid group imparts hydrophilicity to the resin (A1) and enables a pigment to be stably dispersed in water.

Examples of the acid group in the acid group-containing monomer deriving the structural unit (a1) include a carboxy group, a sulfonic acid group, a phosphoric acid group, and a thiocarboxylic group, and an ethylenic unsaturated monomer having these groups can be used as a raw material monomer of the structural unit (a1).

Examples of the ethylenic unsaturated monomer having a carboxy group include unsaturated carboxylic acids such as acrylic acid, methacrylic acid, maleic acid, fumaric acid, crotonic acid, itaconic acid, and 4-vinyl benzoic acid; and polybasic acid unsaturated esters such as vinyl succinate, allyl maleate, vinyl terephthalate, and allyl trimellitate.

Examples of the ethylenic unsaturated monomer having a sulfonic acid group include unsaturated carboxylic acid sulfo-substituted alkyl or aryl esters such as 2-sulfoethyl acrylate and 4-sulfophenyl methacrylate; sulfocarboxylic acid unsaturated esters such as vinyl sulfosuccinate; and sulfostyrenes such as styrene-4-sulfonic acid.

Among these, the monomer deriving the structural unit (a1) is preferably a monomer having a carboxy group as the acid group, more preferably unsaturated carboxylic acids, and preferably acrylic acid or methacrylic acid considering the availability of the raw material monomer, price, and the like.

In the following, both acrylic acid and methacrylic acid may be comprehensively referred to as "(meth)acrylic acid" and both acrylate and methacrylate may be comprehensively referred to as "(meth)acrylate." The same also applies to similar acrylic acid compounds.

Examples of the structural unit (a2) other than the structural unit (a1) include ethylenic unsaturated monomers capable of being copolymerized with (a1), and examples thereof include (meth)acrylates such as methyl (meth)acrylate, ethyl (meth)acrylate, methylpropyl (meth)acrylate, and butyl (meth)acrylate; unsaturated fatty acid esters such as dimethyl maleate, dimethyl fumarate, 2-hydroxyethyl (meth)acrylate, and 2-aminoethyl (meth)acrylate; unsaturated fatty acid amides such as (meth)acrylamide and N-methyl (meth)acrylamide; unsaturated nitriles such as (meth)acrylonitrile; unsaturated ethers such as vinyl acetate and vinyl propionate; styrenes such as styrene, α-methylstyrene, o-methylstyrene, m-methylstyrene, p-methylstyrene, p-t-butylstyrene, 4-methoxystyrene, and 4-chlorostyrene; unsaturated hydrocarbons such as ethylene, propylene, 1-butene, 1-octene, vinylcyclohexane, and 4-vinylcyclohexene; unsaturated halogenated hydrocarbons such as vinyl chloride, vinylidene chloride, tetrafluoroethylene, and 3-chloropropylene; vinyl-substituted heterocyclic compounds such as 4-vinylpyridine, N-vinylcarbazole, and N-vinylpyrrolidone; reaction products of monomers containing substituents having active hydrogen, such as a carboxy group, a hydroxy group, and an amino group in the above exemplified monomers, and epoxides such as ethylene oxide, propylene oxide, and cyclohexene oxide; and reaction products of monomers containing substituents having a hydroxy group, an amino group, and the like in the above exemplified monomers and carboxylic acids such as acetic acid, propionic acid, butanoic acid, hexanoic acid, decanoic acid, and dodecanoic acid.

Among these, the monomer deriving the structural unit (a2) is preferably (meth)acrylates and styrenes and preferably butyl (meth)acylate, styrene, or α-methylstyrene in view of producing an effect of enhancing the adsorptivity of the resin (A1) to the pigment.

Further, the structural unit (a2) also preferably contains methoxypolyethylene glycol monomethacrylate as a monomer because of having an excellent effect of improving ejection properties.

The resin (A1) is a non-cross-linked resin. In the present invention, the resin (A1) being non-cross-linked refers to the resin (A1) being synthesized and produced without intentionally using any compound generally regarded as a cross-linking agent or the resin (A1) being synthesized and produced without undergoing a cross-linking step normally used. The cross-linking rate of the resin (A1) produced without addition of the cross-linking agent or undergoing an intentional cross-linking step is 5% or less, preferably 3% or less, and particularly preferably 0%. The non-cross-linked resin (A1) is basically a straight-chain resin. The above cross-linking rate is a theoretical value, which is 100% when the amount of the cross-linking agent is 1 molar equivalent and 50% when the amount of the cross-linking agent is 0.5 molar equivalent.

In the present invention, abrasion resistance improves by an alkanolamine described below, and thus there is no need to ensure abrasion resistance by the cross-linking of the resin (A1). The resin (A1) being non-cross-linked makes the resolubility of the dispersion and the ink favorable, obtains excellent ink ejection properties, and thus reduces problems such as nozzle clogging failure. In addition, by not undergoing the cross-linking step during the production of the resin (A1), a shortened production step and reduced energy consumption are expected.

The mass average molecular weight of the resin (A1) is preferably in a range of 2,000 to 100,000 and particularly preferably in a range of 5,000 to 50,000 in view of making the pigment dispersion have a moderate viscosity, making dispersion stability favorable, and easily ensuring long-term, stable printing when being made into an inkjet ink.

The acid value of the resin (A1) is generally 80 to 350 mgKOH/g, preferably 80 to 225 mgKOH/g, more preferably 80 to 220 mgKOH/g, and particularly preferably 100 mgKOH/g or more and less than 200 mgKOH/g. It is also preferably less than 170 mgKOH/g.

By making it within the above range, the dispersant's hydrophilicity and pigment adsorption properties are balanced, and the dispersion stability of the pigment dispersion improves.

In the present invention, by making the resin (A1) non-cross-linked, favorable resolubility can be obtained even when the acid value of the resin (A1) is relatively low (for example, less than 200 mgKOH/g or the like).

The glass transition point of the resin (A1) is preferably 30 to 130 °C, more preferably 50 to 120 °C, and particularly preferably 80 to 110 °C.

In the dispersant (A), part or all of the acid groups in the structural unit (a1) in the structural unit (a1) are neutralized by a tertiary alkanolamine having two to three hydroxy groups in the structure and having a boiling point of 150 to 330 °C (hereinafter, may be referred to simply as an "alkanolamine").

The alkanolamine is preferably a compound in which two of the three hydrogen atoms of ammonia ($NH_3$) are replaced with an "organic group having a hydroxy group" and the remaining one is replaced with an organic group or a compound in which all three are replaced with an "organic group having a hydroxy group." The organic group substituting the hydrogen atom is preferably a $C_{1-3}$ alkyl group, and the "organic group having a hydroxy group" substituting the hydrogen atom is preferably a group in which a hydroxy group is bonded to a $C_{1-3}$ alkyl group.

The alkanolamine is preferably a compound represented by Formula (I) below.

[Chemical Formula 1]

(I)

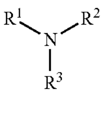

In Formula (I), $R^1$ and $R^2$ are each independently an organic group having a hydroxy group; and $R^3$ is an organic group having an organic group or a hydroxy group.

The boiling point of the alkanolamine is 150 to 330 °C, preferably 200 to 330° °C, more preferably 200 to 320 °C, and even more preferably 220 to 310 °C.

By using the alkanolamine having a boiling point of 330 °C or lower for neutralization, the alkanolamine volatilizes well during drying of a printed product but does not produce an odor like ammonia does. In addition, the alkanolamine having a boiling point of 150 °C or higher does not volatilize in an inkjet nozzle, and thus nozzle clogging and a reduction in ejection properties are less likely to occur.

Examples of the tertiary alkanolamine having a boiling point of 150 to 330 °C include dialkanol tertiary amines such as N-methyldiethanolamine, N-ethyldiethanolamine, N-(3-aminopropyl) diethanolamine; and trialkanol tertiary amines such as triisopropanolamine.

Among these, a $C_{2-9}$ tertiary alkanolamine is preferred, and methyl diethanolamine or triisopropanolamine is particularly preferred.

The method of neutralization by the alkanolamine is not limited to a particularly method, and for example, neutralization can be achieved by adding the alkanolamine and water as needed to the resin (A1) in an organic solvent obtained by monomer synthesis.

Neutralization may be performed by the alkanolamine alone, or other neutralizers may be used in combination. Examples of the other neutralizers include metal salts.

Examples of the metal salts include metal hydroxides such as sodium hydroxide, potassium hydroxide, and lithium hydroxide; metal chlorides such as sodium chloride and potassium chloride; and metal sulfides such as copper sulfate.

The ratio when the alkanolamine and the metal salt are used in combination is, when the neutralization rate described below is 150%, preferably alkanolamine:metal salt=60 to 120%:30 to 90% for a total neutralization rate of 150%. If the neutralization rate is not 150%, the alkanolamine and the metal salt are preferably used in a similar ratio.

Combined use of the metal salt can strike a balance between abrasion resistance and solubility. On the other hand, however, there are problems in that using the metal salt is not suitable for printing for food packaging applications and the like, and thus it is preferable to consider its combined use in consideration of the application.

As to neutralization, only part of the acid groups may be neutralized or all of the acid groups may be neutralized, but it is preferred that all of the acid groups are neutralized.

Specifically, with a neutralization rate when the acid groups of the resin (A1) are neutralized with a theoretical equivalent as 100%, the neutralization rate is greater than 100% and 200% or less, preferably 120 to 200%, and more preferably 150 to 200%. Such a neutralization rate improves the solubility and filterability of the resin (A1).

The dispersant (A) may consist only of the resin (A1) or may have other components in addition to the resin (A1).

In the pigment dispersion of the present invention, the dispersant (A) is contained in the pigment in an amount of preferably 5 to 100% by mass and more preferably 10 to 80% by mass in terms of nonvolatile content with respect to the pigment. Being within these ranges can inhibit a reduction in the dispersion stability of the pigment dispersion due to excess or deficiency of the dispersant and can maintain a stable condition even during long-term storage.

<Pigment (B)>

The pigment (B) is not limited to a particular pigment so long as it can be well dispersed in the dispersion, but one capable of being dispersed with an average particle size of 10 to 400 nm is preferably used (the details will be described below). For example, organic pigments, inorganic pigments, and dyes used in general inks, paints, and recording agents can be used.

Examples of the organic pigments include azo-based, phthalocyanine-based, anthraquinone-based, perylene-based, perinone-based, quinacridone-based, thioindigo-based, dioxazine-based, isoindolinone-based, quinophthalone-based, azomethine azo-based, diketopyrrolopyrrole-based, and isoindoline-based pigments. For indigo inks, copper phthalocyanine is preferably used in view of costs and lightfastness.

Examples of the inorganic pigments include carbon black, titanium oxide, zinc oxide, zinc sulfide, barium sulfate, calcium carbonate, chromium oxide, silica, red oxide, and mica. In addition, a brilliant pigment (Metashine; Nippon Sheet Glass Co., Ltd.), which is made by coating glass flakes or lump flakes as base materials with a metal or metal oxide, can be used. For white inks, black inks, gold and silver inks, and pearl inks, titanium oxide, carbon black, aluminum, and mica are preferably used, respectively, in view of costs and color strength.

As described above, in the dispersion, the pigment is preferably dispersed with a volume average particle size of 10 to 400 nm. As to the average particle size of the pigment, the volume average particle size can be measured by a known method such as dynamic light scattering after the dispersion is prepared, while the pigment is uniformly dispersed in the dispersion. Among others, the volume average particle size of the dispersion is preferably 10 to 300 nm, more preferably 50 to 200 nm, even more preferably 50 to 150 nm, and particularly preferably 50 nm or more and less than 100 nm. The volume average particle size being 50 nm or more inhibits flocculation of the pigment during storage of the pigment dispersion. In addition, the volume average particle size being 400 nm or less (particularly preferably 100 nm or less) improves ink ejection properties.

The content of the pigment in the dispersion is not limited to a particular content but is preferably 10 to 30% by mass in the entire amount of the dispersion. If the content is less than 10% by mass, sufficient ink color strength may not be obtained in an inkjet ink prepared by diluting the dispersion. If the content is greater than 30% by mass, depending on the pigment type, the pigment may flocculate during transportation or storage of the dispersion, in which case dispersibility at an average particle size of 50 to 400 nm cannot be ensured. In addition, there is a concern that ink ejection properties are worsen depending on the degree of dilution.

In the dispersion of the present invention, when the pigment is an organic pigment or carbon black, the pigment concentration is preferably 10 to 30% by mass and more preferably 10 to 25% by mass. Being within these ranges can suitably achieve both ink color strength and ink ejection properties when being diluted and adjusted to be made into an inkjet ink.

When the pigment is an inorganic pigment, the pigment concentration is preferably 25 to 60% by mass and more preferably 30 to 50% by mass.

<Other Optional Components>

The pigment dispersion of the present invention may contain other optional components in addition to the component (A), the component (B), and the water (C) to the extent that the effects of the present invention are not impaired.

Examples of the other components include a binder (D), an amine compound (E) having a boiling point of 100 °C or higher, other resins, solvents other than water, surfactants, waxes, low surface tension organic solvents, wetting agents, penetrating agents, dispersants other than the above ones, antifoaming agents, antiseptics, viscosity adjusting agents, pH adjusting agents, chelating agents, plasticizers, antioxidants, and UV absorbers other than the above components.

<Binder (D)>

The binder (D) is added in order to further improve the base material adhesion and abrasion resistance of the ink. In the present invention, the use of the tertiary alkanolamine described above improves abrasion resistance, and thus sufficient abrasion resistance can be ensured even without using the binder (D).

If the binder (D) has pigment dispersion ability, the binder (D) may cause the dispersant (A) to desorb from the pigment, thus reducing the dispersion stability of the pigment dispersion, and thus it is preferred that the binder (D) does not have pigment dispersion ability.

Examples of preferred binders include an acrylic binder (D1).

(Acrylic Binder (D1))

The acrylic binder (D1) is preferably an acrylic aqueous resin emulsion.

Examples of the acrylic emulsion include acrylic emulsions, styrene acrylic emulsions, acrylic maleic acid emulsions, and styrene acrylic maleic acid emulsions, with acrylic emulsions and styrene acrylic emulsions exemplified as preferred ones. The emulsion may be of the core-shell type or other than the core-shell type.

Examples of the structural unit in the emulsion resin include those described above in the structural unit (a1) and the structural unit (a2) and those that can be copolymerized therewith.

The inventors of the present invention have found in past studies that a higher Tg of the acrylic binder (D1) gives a better result for dry abrasion resistance, whereas a lower Tg of the acrylic binder (D1) can decrease dry abrasion resistance.

The acid value of the acrylic binder (D1) is preferably 5 to 100 mgKOH/g, more preferably 5 to 80 mgKOH/g, and even more preferably 20 to 50 mgKOH/g. If the acid value is less than 5 mg KOH/g, the dispersion stability of the acrylic binder (D1) may decrease. On the other hand, if the acid value is greater than 100 mgKOH/g, the moisture absorbency of a printed film will increase, and wet abrasion resistance out of abrasion resistance may be impaired.

The glass transition point of the acrylic binder (D1) is preferably 0 to 100 °C, more preferably 0 to 80 °C, even more preferably 0 to 70° °C, and particularly preferably 10 to 40 °C.

By making it within the above range, a drying time after printing can be shortened, which is preferred from the viewpoint of improving printing speed and energy saving.

The volume average particle size of the acrylic binder (D1) is preferably 20 to 100 nm and more preferably 20 to 80 nm. The volume average particle size can be measured, for example, by filling a cell with resin diluted with ion exchanged water and using UPA-EX150 under the following conditions.

Loading index: 5±1

Measurement time: 180 seconds

Number of times of measurement: 5

Transparency: Transparent

Particle refractive index: 1.80

Shape: True sphere

Density: 1.00

Solvent refractive index: 1.333

Viscosity at high temperature: 30° °C, 0.797

Viscosity at low temperature: 20° °C, 1.002

Filter: Stand: Norm

Sensitivity: Standard

UPA compatible mode

In addition, it is of course possible to use commercially available products as the acrylic binder (D1). Examples of the commercially available products include ME-2039, XJE-509, XJE-518, XJE-520, and XJE-556 (manufactured by Seiko PMC Corporation, acrylic emulsions) and Joncryl 631 and Joncryl 731 (manufactured by BASF).

The binder (D) can further contain other components instead of or in addition to the acrylic binder (D1). As the other components, polyurethane resins are preferred, and polyether polyol polyurethane resins are preferably used in view of being less likely to cause hydrolysis than polyester polyol polyurethanes and have particularly excellent abrasion resistance for colored images. Examples of such polyether polyol polyurethane resins include polyurethane resins made by reacting polytetramethylene ether glycol (PTMG) and diisocyanate as essential components.

When the dispersion of the present invention contains the binder (D), the binder D is contained in an amount of preferably 10 to 200% by mass and more preferably 30 to 150% by mass in terms of nonvolatile content. Being within these ranges achieves both the adhesion of the inkjet ink to the base material and abrasion resistance and blocking resistance even after dilution, which is preferred.

(Amine Compound (E) Having Boiling Point of 100 °C or Higher)

The pigment dispersion of the present invention preferably contains the amine compound (E) having a boiling point of 100 °C or higher. By adding the amine compound (E), excessive drying of the ink is more inhibited, and the ink does not cause nozzle clogging, resulting in favorable ejection properties, and both ejection properties and abrasion resistance can be achieved.

Examples of the amine compounds (E) include polyalkyleneimines, polyallylamines, (poly)ethylene polyamines, alkanolamines, and alkylamines.

Among these, the alkanolamines are preferred from the viewpoint of pigment dispersibility, odors, and resolubility.

(Polyalkyleneimines)

The polyalkyleneimines are preferably polyalkyleneimines having a $C_{2-5}$ alkylene group.

The polyalkyleneimines are preferably polyalkyleneimines having a $C_{2-4}$ alkylene group, more preferably polyethyleneimine or polypropyleneimine, and even more preferably polyethyleneimine. One or two or more of these may be used.

The number average molecular weight of the polyalkyleneimines is preferably 150 or more, more preferably 500 or more, even more preferably 800 or more, and still even more preferably 1,000 or more and preferably 10,000 or less, more preferably 5,000 or less, and even more preferably 4,000 or less.

The value of the molecular weight is obtained by the method described in Examples.

(Polyallylamines)

Examples of the polyallylamines include polymers having an amino group in their side chain, such as homopolymers or copolymers of allyl compounds such as allylamine and dimethylallylamine.

The weight average molecular weight of the polyallylamines is preferably 800 or more, more preferably 1,000 or more, even more preferably 1,500 or more and preferably 10,000 or less, more preferably 5,000 or less, and even more preferably 4,000 or less.

(Polyethylene Polyamines)

Examples of the (poly)ethylene polyamines include ethylenediamine, diethylenetriamine, triethylenetetramine, tetraethylenepentamine, and pentaethylenehexamine. Among these, diethylenetriamine, triethylenetetramine, and tetraethylenepentamine are preferred.

(Alkanolamines)

The alkanolamines are preferably $C_{2-9}$ alkanolamines. Examples of the alkanolamines include primary alkanolamines such as monoethanolamine, monopropanolamine, and monobutanolamine; secondary alkanolamines such as monoalkanol secondary amines such as N-methylethanolamine and N-methylpropanolamine and dialkanol secondary amines such as diethanolamine and diisopropanolamine; and tertiary alkanolamines such as monoalkanol tertiary amines such as N,N-dimethylethanolamine, N,N-dimethylpropanolamine, and N,N-diethylethanolamine, dialkanol tertiary amines such as N-methyldiethanolamine and N-ethyldiethanolamine, and trialkanol tertiary amines such as triethanolamine and triisopropanolamine. Among these, $C_{2-9}$ tertiary alkanolamines are preferred, and triisopropanolamine is particularly preferred.

(Alkylamines)

The alkylamines are preferably $C_{1-6}$ alkylamines. Examples of the alkylamines include primary amines such as propylamine, butylamine, and hexylamine; and secondary amines such as diethylamine and dipropylamine.

In the pigment dispersion of the present invention, the amine compound (E) preferably has a neutralization rate of 30 to 500% with respect to the acid group of the dispersant (A), and the neutralization rate is particularly preferably set to a range of 50 to 400%. Being within these ranges provides an ink not causing nozzle clogging and also having excellent adhesion and abrasion resistance.

(Components Other than Components (A) to (E))

As the other resins, aqueous resins suitable for preparing the pigment dispersion are good, and preferred examples thereof include polyvinyl alcohols; polyvinyl pyrrolidones; acrylic resins such as poly(acrylic acid-co-acrylate); styrene-acrylic resins such as poly(styrene-co-acrylic acid), poly(styrene-co-methacrylic acid), poly(styrene-co-methacrylic acid-co-acrylate), poly(styrene-co-α-methylstyrene-co-acrylic acid), and poly(styrene-co-α-methylstyrene-co-acrylic acid-co-acrylate); poly(styrene-co-maleic acid), poly(styrene-co-maleic anhydride), poly(vinylnaphthalene-co-acrylic acid), and salts of the aqueous resins, which do not fall under the above components.

Examples of the solvents other than water include alcohol solvents such as methanol, ethanol, n-propanol, and isopropanol; ketone solvents such as acetone and methyl ethyl ketone; polyalkylene glycols such as ethylene glycol, diethylene glycol, and propylene glycol; alkyl ethers of polyalkylene glycols; lactam solvents such as N-methyl-2-pyrrolidone.

Examples of the surfactant include anionic surfactants, nonionic surfactants, cationic surfactants, and amphoteric surfactants, and among these, anionic surfactants and nonionic surfactants are preferable.

Examples of the anionic surfactants include alkylbenzene sulfonates, alkylphenyl sulfonates, alkylnaphthalene sulfonates, higher fatty acid salts, sulfates of higher fatty acid esters, sulfonates of higher fatty acid esters, sulfates and sulfonates of higher alcohol ethers, higher alkyl sulfosuccinates, polyoxyethylene alkyl ether carboxylates, polyoxyethylene alkyl ether sulfates, alkyl phosphates, and polyoxyethylene alkyl ether phosphates, and specific examples thereof include dodecylbenzene sulfonate, isopropylnaphthalene sulfonate, monobutylphenylphenol monosulfonate, monobutylbiphenyl sulfonate, and dibutylphenylphenol disulfonate.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylolamides, alkyl alkanolamides, acetylene glycol, oxyethylene adducts of acetylene glycol, polyethylene glycol-polypropylene glycol block copolymers, and alkylphenol ethoxylates, and preferred among these are polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, oxyethylene adducts of acetylene glycol, polyethylene glycol-polypropylene glycol block copolymers, and alkylphenol ethoxylates.

Other examples of the surfactant are silicone surfactants such as polysiloxane oxyethylene adducts; fluorosurfactants such as perfluoroalkyl carboxylates, perfluoroalkyl sulfonates, and oxyethylene perfluoroalkyl ethers; and biosurfactants such as spiculisporic acid, rhamnolipids, and lysolecithin.

These surfactants can be used alone or as a mixture of two or more. Considering the dissolution stability and the like of the surfactant, its HLB is preferably in a range of 7 to 20.

Examples of commercially available fluorosurfactants include Novec FC-4430 and FC-4432 (manufactured by Sumitomo 3M Ltd.), Zonyl FSO-100, FSN-100, FS-300, and FSO (manufactured by Du Pont), Eftop EF-122A, EF-351, 352, 801, and 802 (manufactured by Gemco), Megafac F-470, F-1405, F474, and F-444 (manufactured by DIC Corporation), Surflon S-111, S-112, S-113, S121, S131, S132, S-141, and S-145 (manufactured by Asahi Glass Co., Ltd.), the Ftergent series (manufactured by Neos Company Limited), the Fluorad FC series (manufactured by Minnesota Mining and Manufacturing Company), Monflor (manufactured by Imperial Chemical Industries), and the Licowet VPF series (manufactured by Farbewerke Hoechst AG).

Examples of the silicone surfactants include KF-351A, KF-642, Olfine PD-501, Olfine PD-502, and Olfine PD-570 (manufactured by Shin-Etsu Chemical Co., Ltd.) and BYK 347 and BYK 348 (manufactured by BYK-Chemie Japan K.K.).

Examples of the polyoxyethylene alkyl ether surfactants include the BT series (Nikko Chemicals Co., Ltd.), the Nonipol series (manufactured by Sanyo Chemical Industries, Ltd.), the D- and P-series (manufactured by Takemoto Oil & Fat Co., Ltd.), the EMALEX DAPE series (manufactured by Nihon Emulsion Co., Ltd.), and the Pegnol series (manufactured by Toho Chemical Industry Co., Ltd.). Examples of the polyethylene glycol alkyl ester-based one include Pegnol (manufactured by Toho Chemical Industry Co., Ltd.).

Examples of the acetylene glycol surfactants include Olfine E1010, STG, and Y (manufactured by Nissin Chemical Co., Ltd.) and Surfynol 104, 82, 420, 440, 465, 485, and TG (manufactured by Air Products and Chemicals Inc.).

Examples of the waxes include waxes such as plant and animal waxes such as carnauba wax, candelilla wax, beeswax, rice wax, and lanolin; mineral waxes such as montan wax and ozokerite; paraffin waxes, or what are called petroleum waxes; synthetic waxes such as carbon waxes, Hoechst wax, polyolefin waxes, silicone waxes, and stearic acid amide; natural and synthetic wax emulsions such as poly($\alpha$-olefin-co-maleic anhydride); and blended waxes. These waxes have the effect of imparting slipping properties to the surface of a formed recorded product and improving abrasion resistance. These waxes can be used alone or as a mixture of a plurality of ones. Among these, silicone waxes, polyolefin waxes, and paraffin waxes are preferably used.

Examples of commercially available products of the silicone waxes include SM 8706 EX, SM 7036 EX, SM 7060 EX, SM 7025 EX, SM 490 EX, SM 8701 EX, SM 8709 SR, SM 8716 SR, IE-7045, IE-7046T, SH 7024, BY22-744EX, BY22-818EX, FZ-4658, FZ-4634EX, and FZ-4602 (product names, manufactured by Dow Corning Toray Co., Ltd.) and POLON-MF-14, POLON-MF-14EC, POLON-MF-23, POLON-MF-63, POLON-MF-18T, POLON-MF-56, POLON-MF-49, POLON-MF-33A, POLON-MF-55T, POLON-ME-28T, POLON-MF-50, POLON-MK-206, POLON-SR-CONC, KM-9771, KM-9774, KM-2002-T, KM-2002-L-1, KM-9772, KS-7002, KS-701, and X-51-1264 (product names, manufactured by Shin-Etsu Chemical Co., Ltd.).

Examples of the polyolefin waxes include waxes and copolymers produced from olefins such as ethylene, propylene, and butylene or derivatives thereof and copolymers thereof and specifically polyethylene waxes, polypropylene waxes, and polybutylene waxes. The polyolefin waxes can be used alone or in combination of two or more. Among these, polyethylene waxes are preferred from the viewpoint that they are less likely to react with cross-linking groups of urethane resin particles having the above cross-linking groups and capable of providing excellent ejection stability.

Examples of commercially available products of the polyolefin waxes include the AQUACER series such as AQUACER 513 (polyethylene wax, average particle size: 100 nm or more and 200 nm or less, melting point: 130° °C, solid content: 30%), AQUACER 507, AQUACER 515, AQUACER 840, and AQUACER 1547 (product names, manufactured by BYK-Chemie Japan K.K.), the Hitec series such as Hitec E-7025P, Hitec E-2213, Hitec E-6500, Hitec E-6314, Hitec E-9460, Hitec E-9015, Hitec E-4A, Hitec E-5403P, and Hitec E-8237 (product names, manufactured by Toho Chemical Industry Co., Ltd., polyethylene waxes), Nopcoat PEM-17 (product name, manufactured by San Nopco Ltd., polyethylene emulsion, average particle size: 40 nm), and ULTRALUBE E-843N (product name, manufactured by Keim-Additec Surface GmbH, polyethylene wax).

The paraffin waxes are what are called petroleum waxes. The paraffin means an alkane with a carbon atom number of 20 or more, and the paraffin wax refers to a mixture of hydrocarbons with a molecular weight of about 300 to 500, containing mainly a linear paraffinic hydrocarbon with a carbon number of 20 or more and 30 or less and containing small amounts of iso-paraffins. The ink containing the paraffin waxes imparts slipping properties and water repellency to a recorded product, thereby improving abrasion resistance.

Examples of commercially available products of the paraffin waxes include AQUACER 537 and AQUACER 539 (product names, manufactured by BYK-Chemie Japan K. K.).

The wax is preferably contained in the pigment dispersion in a particulate state, that is, in an emulsion state or suspension state. This makes it easier to adjust the viscosity of the ink to be in a proper range for ejection using an inkjet head and also makes it easier to ensure ejection stability and intermittent ejection characteristics during recording.

Examples of low surface tension organic solvents include, as glycol ether compounds, diethylene glycol mono($C_{1-8}$ alkyl) ethers, triethylene glycol mono($C_{1-8}$ alkyl) ethers, propylene glycol mono($C_{1-6}$ alkyl) ethers, and dipropylene glycol mono($C_{1-6}$ alkyl) ethers, one of which or a mixture of two or more of which can be used.

Specific examples thereof include ethylene glycol monomethyl ether, ethylene glycol monoethyl ether, ethylene glycol mono-iso-propyl ether, ethylene glycol monobutyl ether, ethylene glycol mono-t-butyl ether, diethylene glycol monomethyl ether, diethylene glycol monoethyl ether, diethylene glycol monopropyl ether, diethylene glycol mono-iso-propyl ether, diethylene glycol monobutyl ether, diethylene glycol mono-t-butyl ether, diethylene glycol monopentyl ether, diethylene glycol monohexyl ether, diethylene glycol monoheptyl ether, diethylene glycol monooctyl ether, triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, triethylene glycol monoheptyl ether, triethylene glycol monooctyl ether, propylene glycol monomethyl ether, propylene glycol monoethyl ether, propylene glycol monopropyl ether, propylene glycol mono-iso-propyl ether, propylene glycol monobutyl ether, propylene glycol mono-t-butyl ether, propylene glycol monopentyl ether, propylene glycol monohexyl ether, dipropylene glycol monomethyl ether, dipropylene glycol monoethyl ether, dipropylene glycol monopropyl ether, dipropylene glycol mono-iso-propyl ether, dipropylene glycol monobutyl ether, dipropylene glycol monopentyl ether, and dipropylene glycol monohexyl ether.

Glycol ethers, surfactants, and the like can be used as surface tension adjusting agents to prepare the surface tension of the ink. Specifically, they can be added as appropriate so that the surface tension of the ink is 15 mN/m to 30 mN/m or less, and the addition amount of the surfactant is in a range of preferably about 0.1 to 10% by mass and more preferably 0.3 to 2% by mass with respect to the aqueous pigment dispersion. The surface tension is more preferably in a range of 16 to 28 and most preferably in a range of 18 to 25.

There is no particular limitation as the wetting agents, but preferred is one having miscibility with water and producing a clogging prevention effect on inkjet printer heads. Examples thereof include glycerin; diol compounds such as ethylene glycol, diethylene glycol, triethylene glycol, polyethylene glycol with a molecular weight of 2,000 or less, propylene glycol, dipropylene glycol, tripropylene glycol, 1,3-propylene glycol, isopropylene glycol, isobutylene glycol, 1,2-butanediol, 1,4-butanediol, 1,2-pentanediol, 1,5-pentanediol, 1,2-hexanediol, 1,6-hexanediol, 2-methylpentane-2,4-diol, 1,2-heptanediol, 1,2 nonanediol, 1,2-octanediol, 1,2-hexanediol, 1,2-heptanediol, 1,2-nonanediol, and 1,2-octanediol, 1,4-butanediol, 1,3-butanediol, meso-erythritol, pentaerythritol; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam. Among these, containing propylene glycol and 1,3-butyl glycol has safety and produces excellent effects on ink drying properties and ejection performance.

The content of the wetting agents in the ink is preferably 3 to 50% by mass.

Examples of the penetrating agents include lower alcohols such as ethanol and isopropyl alcohol; ethylene oxide adducts of alkyl alcohols such as ethylene glycol hexyl ether and diethylene glycol butyl ether; and propylene oxide adducts of alkyl alcohols such as propylene glycol propyl ether. The content of the penetrating agents in the pigment dispersion is preferably 0.01 to 10% by mass.

<Method for Producing Pigment Dispersion>

The method for producing the pigment dispersion in the present invention is not limited in any way.

The components (A) to (C) and optional components such as the components (D) and (E) to be added as needed may be dispersed to form a pigment dispersion, or a pigment dispersion mill base liquid with a high pigment concentration may be prepared with part of the components (A), (B) and (C), a medium, and the like in advance, to which optional components such as the component (D) may be added as appropriate, which may be diluted with an aqueous medium such as the component (C) to form a pigment dispersion for the preparation of an aqueous inkjet ink. The pigment dispersion mill base liquid is produced in advance by dispersing the pigment using a stirring and dispersing apparatus, then the pigment dispersion is produced, and thereby an aqueous pigment dispersion with the pigment dispersed with a desired volume average particle size can be easily obtained.

The following describes the method of producing the pigment dispersion mill base liquid and then forming the pigment dispersion, which is the latter.

Examples of the method for producing the pigment dispersion mill base liquid include the following methods.

(1) A method for preparing the pigment dispersion mill base liquid by adding a pigment to an aqueous medium containing a pigment dispersant as needed and then dispersing the pigment in the aqueous medium using a stirring and dispersing apparatus.

(2) A method for preparing the pigment dispersion mill base liquid by kneading a pigment and a pigment dispersant as needed using a kneader such as a two-roll or a mixer, adding the obtained kneaded product into an aqueous medium, and using a stirring and dispersing apparatus.

(3) A method for preparing the pigment dispersion mill base liquid by adding a pigment to a solution obtained by dissolving a pigment dispersant in an organic solvent having compatibility with water, such as methyl ethyl ketone or tetrahydrofuran, then dispersing the pigment in the organic solution using a stirring and dispersing apparatus, then performing phase inversion emulsification using an aqueous medium, and then distilling off the organic solvent.

Examples of the stirring and dispersing apparatus include ultrasonic homogenizers, high-pressure homogenizers, paint shakers, ball mills, roll mills, sand mills, sand grinders, dyno mills, Dispermat, SC mills, and nanomizers, and one of these may be used alone, or two or more apparatuses may be used in combination.

<Inkjet Ink>

Using the pigment dispersion of the present invention, it is diluted with an aqueous medium so as to give a pigment content of 1 to 30% by mass to make an aqueous inkjet ink. This aqueous medium may be water, a mixture of water and an organic solvent, or only an organic solvent, as in the component (C). The organic solvent is not limited to a particular organic solvent so long as it is miscible with water, and examples thereof include those described above in the optional components as "solvents other than water."

The aqueous medium can also contain optional components of the pigment dispersion (for example, the component (D), antiseptics, surface tension adjusting agents, and the like).

<Printed Product>

The inkjet ink of the present invention has excellent adhesion to various types of base materials and can thus suitably produce a printed product having a plastic base material and a printed layer of the inkjet ink.

Examples of the plastic base material include plastic base materials formed of thermoplastic resins such as polyamide resins such as Ny 6 (nylon 6), Nylon 66, and Nylon 46; polyester resins such as polyethylene terephthalate, polyethylene naphthalate, polytrimethylene terephthalate, polytrimethylene naphthalate, polybutylene terephthalate, and polybutylene naphthalate; polyhydroxycarboxylic acids such as polylactic acid; biodegradable resins represented by aliphatic polyester resins such as poly(ethylene succinate) and poly(butylene succinate); polyolefin resins such as polypropylene and polyethylene; polyvinyl chloride, polyimide resins, and polyarylate resins or mixtures thereof and laminates of these plastic base materials. Among these, base materials formed of polyester, polyamide, polyethylene, polypropylene, or polyvinyl chloride can be suitably used.

The plastic base material may also be a plastic film. The plastic film may be either a non-oriented film or an oriented film, and the method for producing it is not limited. The thickness of the film is also not limited to a particular thickness and may be usually in range of 1 to 500 μm.

The printing face of the film is preferably treated with corona discharge. The printing face may be deposited with silica, alumina, or the like.

The printed product of the present invention has good adhesion to the plastic base material and can be produced by inkjet printing, and thus it can be suitably used as packaging materials. In particular, it has excellent design and on-demand printability, and thus it can be particularly suitably used for food packaging. The inkjet ink of the present invention has excellent abrasion resistance, and thus the printed product of the present invention can also be a front-printed printed product, in which inkjet printing is performed on the face to be a front face.

EXAMPLES

The following describes the present invention specifically with reference to examples and comparative examples. In the following, unless otherwise specified, "parts" means "parts by mass" and "%" means "% by mass."

Example 1

<Production of Dispersing Resin>

Methyl ethyl ketone (MEK) in an amount of 600 g was put into a 2 L stainless flask, into which nitrogen was blown at 20 mL/min, and was heated up to 80° °C using an oil bath while stirring at 100 rpm. Into the flask, 84.5 g of methacrylic acid, 215.0 g of styrene, 200.0 g of butyl methacrylate, and 18.0 g of Perbutyl (registered trademark) 0 (manufactured by NOF Corporation), which had been mixed together in advance, were added dropwise at 2 g/min. Subsequently, the mixture was stirred for 16 hours while the internal temperature was maintained at 80 °C to obtain a resin A with a nonvolatile content of 45%, an acid value of 110, and a weight average molecular weight of 20,000.

<Production of Pigment Dispersion>

Put into a 100 mL plastic container were 13.6 g of ion exchanged water, 0.21 g of methyl dimethanolamine (MDEA, boiling point: 247 °C) (neutralization rate: 150%), 1.3 g of the dispersing resin A, 4.0 g of a copper phthalocyanine pigment (manufactured by DIC Corporation, TGR-SD), and 100 g of 0.5 mm dia. zirconia beads (manufactured by Nikkato Corporation, YTZ), which were subjected to dispersion processing for 1 hour. Subsequently, the beads were removed, MEK was sufficiently distilled off, then the pigment concentration was adjusted to 15%, and filtration was performed using a membrane filter with a pore size of 8 μm (manufactured by Merck Millipore, nitrocellulose) to obtain a pigment dispersion.

[Production of Inkjet Ink]

The produced pigment dispersion, a binder, a water-soluble solvent, and the like were mixed together to obtain a water-based inkjet ink with a pigment concentration of 5%, a styrene-acrylic binder (manufactured by Seiko PMC Corporation, acid value: 30, Tg: 20 °C) concentration of 1.5%, a polyethylene oxide wax (manufactured by Keim-Additec Surface GmbH) concentration of 1.18, a total of 28% of water-soluble solvents (10% of propylene glycol, 5% of 1,3-butanediol, 3% of 1,2-hexanediol, and 10% of 2-pyrrolidone), and an antiseptic and surface tension adjusting agent concentration of 0.1 to 1.0%.

Example 2

A pigment dispersion and an aqueous inkjet ink were obtained in the same manner as in Example 1 except that 13.5 g of ion exchanged water and 0.28 g of MDEA (neutralization rate: 200%) were used in the step of production of the pigment dispersion.

Example 3

A dispersing resin B with a nonvolatile content of 45%, an acid value of 170, and a weight average molecular weight of 8,000 was obtained in the same manner as in Example 1 except that 130.6 g of methacrylic acid, 153.9 g of butyl methacrylate, 215.0 g of styrene, and 36.0 g of Perbutyl (registered trademark) O were used in the step of production of the dispersing resin.

Further, a pigment dispersion and an aqueous inkjet ink were obtained in the same manner as in Example 1 except that 13.3 g of ion exchanged water, 0.52 g of triisopropanolamine (TIPA, boiling point: 305 °C) (neutralization rate: 150%), and 1.3 g of the dispersing resin B were used in the step of production of the pigment dispersion.

Example 4

A pigment dispersion and an aqueous inkjet ink were obtained in the same manner as in Example 3 except that 13.6 g of ion exchanged water and 0.22 g of MDEA (neutralization rate: 101%) were used in the step of production of the pigment dispersion.

Example 5

A pigment dispersion and an aqueous inkjet ink were obtained in the same manner as in Example 3 except that 13.5 g of ion exchanged water and 0.32 g of MDEA (neutralization rate: 150%) were used in the step of production of the pigment dispersion.

Example 6

A dispersing resin C with a nonvolatile content of 45%, an acid value of 215, and a weight average molecular weight of 8, 500 was obtained in the same manner as in Example 1 except that 138.3 g of acrylic acid, 0.0 g of methacrylic acid, 0.0 g of butyl methacrylate, 361.2 g of styrene, and 26 g of Perbutyl (registered trademark) O were used in the step of production of the dispersing resin.

Further, a pigment dispersion and an aqueous inkjet ink were obtained in the same manner as in Example 3 except that 13.2 g of ion exchanged water, 0.66 g of TIPA (neutralization rate: 150%), and 1.3 g of the dispersing resin C were used in the step of production of the pigment dispersion.

Example 7

A pigment dispersion and an aqueous inkjet ink were obtained in the same manner as in Example 6 except that 13.5 g of ion exchanged water and 0.32 g of MDEA (neutralization rate: 150%) were used in the step of production of the pigment dispersion.

Comparative Example 1

A pigment dispersion and an aqueous inkjet ink were obtained in the same manner as in Example 3 except that 13.6 g of ion exchanged water and 0.17 g of a 35% aqueous potassium hydroxide solution (KOH) (neutralization rate: 60%) were used in the step of production of the pigment dispersion.

Comparative Example 2

A pigment dispersion and an aqueous inkjet ink were obtained in the same manner as in Example 3 except that 13.6 g of ion exchanged water and 0.22 g of 35% KOH (neutralization rate: 75%) were used in the step of production of the pigment dispersion.

Comparative Example 3

A pigment dispersion and an aqueous inkjet ink were obtained in the same manner as in Example 3 except that 13.5 g of ion exchanged water and 0.27 g of triethanolamine (TEA, boiling point: 335 °C) (neutralization rate: 100%) were used in the step of production of the pigment dispersion.

Comparative Example 4

A pigment dispersion and an aqueous inkjet ink were obtained in the same manner as in Example 3 except that 13.4 g of ion exchanged water and 0.40 g of TEA (neutralization rate: 150%) were used in the step of production of the pigment dispersion.

Comparative Example 5

A pigment dispersion and an aqueous inkjet ink were obtained in the same manner as in Example 3 except that 13.5 g of ion exchanged water and 0.35 g of TIPA (neutralization rate: 100%) were used in the step of production of the pigment dispersion.

Comparative Example 6

A pigment dispersion and an aqueous inkjet ink were obtained in the same manner as in Example 6 except that 13.5 g of ion exchanged water and 0.28 g of 35% KOH (neutralization rate: 75%) were used in the step of production of the pigment dispersion.

Comparative Example 7

A pigment dispersion and an aqueous inkjet ink were obtained in the same manner as in Example 6 except that 13.7 g of ion exchanged water and 0.11 g of a 28% aqueous ammonia solution (neutralization rate: 80%) were used in the step of production of the pigment dispersion.

Comparative Example 8

A pigment dispersion and an aqueous inkjet ink were obtained in the same manner as in Example 6 except that 13.6 g of ion exchanged water and 0.20 g of dimethylethanolamine (DMEA, boiling point: 133 °C) (neutralization rate: 100%) were used in the step of production of the pigment dispersion.

Comparative Example 9

A pigment dispersion was obtained in the same manner as in Example 6 except that 13.4 g of ion exchanged water and 0.37 g of 35% KOH (neutralization rate: 100%) were used in the step of production of the pigment dispersion.

To the obtained dispersion, 0.43 g (50% equivalent) of polyglycerol polyglycidyl ether (manufactured by Nagase ChemteX Corporation, epoxy equivalent: 183) was added, and the mixture was stirred at 70 °C for 3 hours to perform resin cross-linking treatment. Further, filtration was performed using a membrane filter with a pore size of 8 μm (manufactured by Merck Millipore, nitrocellulose).

A pigment dispersion and an aqueous inkjet ink were obtained in the same manner as in Example 6 for the others.

Comparative Example 10

Cross-linking treatment was performed in the same manner as in Comparative Example 9 except that 13.4 g of ion exchanged water and 0.44 g of TIPA (neutralization rate: 100%) were used in the step of production of the pigment dispersion to obtain a pigment dispersion and an inkjet ink.

Comparative Example 11

Cross-linking treatment was performed in the same manner as in Comparative Example 9 except that 13.5 g of ion exchanged water and 0.34 g of TEA (neutralization rate: 100%) were used in the step of production of the pigment dispersion to obtain a pigment dispersion and an inkjet ink.

<Production of Printed Product for Evaluation>

The ink composition was filled in an ink cartridge of an inkjet printer (manufactured by Seiko Epson Corporation, MJ-510C), with which a solid design was printed on a corona-treated polypropylene (OPP) biaxially oriented film ("Pylen P2161" manufactured by Toyobo Co., Ltd., thickness: 20 μm), a corona-treated (PVC) film ("LSPVC 1270f"

manufactured by Sakurai Co., Ltd., 140 μm), or a corona-treated polyethylene terephthalate (PET) film ("Ester E5100" manufactured by Toyobo Co., Ltd., thickness: 12 μm) was dried with a dryer, and was further put into a 90 °C oven to be dried for 10 minutes to obtain a printed product.

<Odor Test>

In accordance with the six-level odor indication method in the Malodor Prevention Law, an amine odor in the oven when the pigment dispersion and the printed product for evaluation at room temperature were dried at 90° °C was subjected to sensory evaluation. A is determined to be passed.

A: Level 0 and 1 (being odorless to a barely detectable odor)

B: Level 2 to 5 (a weak odor with which what odor it is can be identified to a strong odor)

<Filterability>

The pigment dispersion adjusted to have a pigment concentration of 15% was filtered using a membrane filter with a pore size of 8 μm (manufactured by Merck Millipore, nitrocellulose), and filterability was evaluated based on the following criteria. The sample with the cross-linking treatment was determined by filterability after the cross-linking treatment. A is determined to be passed.

A: Filtration rate of 150 g/min or more B: Filtration rate of 50 g/min to 150 g/min C: Filtration rate of 50 g/min or less or filter clogging before passing of 26 g of liquid.

<Abrasion Resistance>

In accordance with JIS K5701-1: 2000, using a Gakushin type friction fastness tester (manufactured by Tester Sangyo Co., Ltd., AB-301), the abrasion resistance of the printed product printed on the OPP film, the PVC film, or the PET film was evaluated. The printed product was set in the tester, and tests were conducted, for a dry friction test, on the conditions of PPC paper as friction paper, a load of 200 g, and 100 times of going and returning and, for a wet friction test, on the conditions of Kanakin #3 wetted with ion exchanged water as friction paper, a load of 200 g, and 10 times of going and returning. The degree of ink peeling in the printed product after the test was visually evaluated in accordance with the following criteria. B or higher is determined to be passed.

A: No peeling occurred at all.

B: Peeling of less than 1% occurred.

C: Peeing of 18 or more and less than 5% occurred.

D: Peeling of 5% or more and less than 10% occurred.

<Resolubility Evaluation>

The aqueous inkjet ink for a plastic base material with the pigment concentration adjusted of each example in an amount of 30 μL was applied onto a glass slide and was left at rest in an 80 °C dryer for 10 minutes to produce a test plate. Subsequently, it was immersed in room temperature water for 60 seconds and was visually checked to see if it dissolved again. B or higher is determined to be passed.

A: One with no colored components observed on the glass slide after being immersed for 30 seconds and taken out and with no particulate, undissolved objects observed in the immersion liquid B: One with a few undissolved objects observed on the glass slide or in the immersion liquid, which are within the acceptable range C: One with undissolved objects clearly observed on the glass slide or in the immersion liquid D: One with undissolved objects markedly observed on the glass slide or in the immersion liquid The textile printing agents evaluated to be passed or higher in this experiment show resolubility in screen recording or, in inkjet recording, can be easily ejected by a cleaning operation after a long-term suspension of printing.

TABLE 1

| | | Example 1 | Example 2 | Example 3 | Example 4 | Example 5 |
|---|---|---|---|---|---|---|
| Acid group-containing resin dispersant | Dispersant | Resin A | | Resin B | | |
| | | Styrene-methacrylic acid | | | | |
| | Acid value | 110 | | 170 | | |
| | Molecular weight | 20000 | | 8000 | | |
| | Cross-linking | Non-cross-linked | | | | |
| Neutralizer | | MDEA | | TIPA | MDEA | MDEA |
| | Boiling point | 247 °C | | 305 °C | 247 °C | |
| | Neutralization rate | 150% | 200% | 150% | 101% | 150% |
| Odor | | A | A | A | A | A |
| Filterability | | A | A | A | A | A |
| Resolubility | | B | B | B | B | B |
| OPP | Dry friction | A | A | A | A | A |
| | Wet friction | A | A | B | B | B |
| PET | Dry friction | A | A | A | A | A |
| | Wet friction | A | A | A | A | A |
| PVC | Dry friction | A | A | A | A | A |
| | Wet friction | A | A | A | A | A |

TABLE 2

| | | Example 6 | Example 7 |
|---|---|---|---|
| Acid group-containing resin dispersant | Dispersant | Resin C | |
| | | Styrene-acrylic acid | |

TABLE 2-continued

| | | Example 6 | Example 7 |
|---|---|---|---|
| | Acid value | 215 | |
| | Molecular weight | 8500 | |
| | Cross-linking | Non-cross-linked | |
| | | TIPA | MDEA |
| Neutralizer | Boiling point | 305 °C | 247 °C |
| | Neutralization rate | 150% | 150% |
| Odor | | A | A |
| | Filterability | A | A |
| | Resolubility | B | B |
| OPP | Dry friction | B | B |
| | Wet friction | B | B |
| PET | Dry friction | A | A |
| | Wet friction | A | A |
| PVC | Dry friction | A | A |
| | Wet friction | A | A |

TABLE 3

| | | Comparative Example 1 | Comparative Example 2 | Comparative Example 3 | Comparative Example 4 | Comparative Example 5 |
|---|---|---|---|---|---|---|
| Acid group-containing resin dispersant | Dispersant | | | Resin B Styrene-methacrylic acid | | |
| | Acid value | 170 | | | | |
| | Molecular weight | 8000 | | | | |
| | Cross-linking | | | Non-cross-linked | | |
| Neutralizer | | KOH | | TEA | | TIPA |
| | Boiling point | 1324 °C | | 335 °C | | 305 °C |
| | Neutralization rate | 60% | 75% | 100% | 150% | 100% |
| Odor | | A | A | A | A | A |
| Filterability | | C | A | C | A | C |
| Resolubility | | D | B | B | B | B |
| OPP | Dry friction | B | B | B | B | A |
| | Wet friction | C | D | D | D | B |
| PET | Dry friction | A | A | A | A | A |
| | Wet friction | D | D | C | C | B |
| PVC | Dry friction | A | A | A | A | A |
| | Wet friction | D | D | C | C | B |

TABLE 4

| | | Comparative Example 6 | Comparative Example 7 | Comparative Example 8 | Comparative Example 9 | Comparative Example 10 | Comparative Example 11 |
|---|---|---|---|---|---|---|---|
| Acid group-containing resin dispersant | Dispersant | | | Resin C Styrene-acrylic acid | | | |
| | Acid value | 210 | | | | | |
| | Molecular weight | 8000 | | | | | |
| | Cross-linking | | Non-cross linked | | | Cross-linking | |
| Neutralizer | | KOH | NH3 | DMEA | KOH | TIPA | TEA |
| | Boiling point | 1324 °C | −34 °C | 133 °C | 1324 °C | 305 °C | 335 °C |
| | Neutralization rate | 75% | 80% | 100% | 100% | 100% | 100% |
| Odor | | A | B | B | A | A | A |
| Filterability | | C | C | C | C | C | C |
| Resolubility | | B | D | D | C | D | C |
| OPP | Dry friction | B | A | A | B | B | B |
| | Wet friction | D | A | A | C | B | B |
| PET | Dry friction | A | A | A | A | A | A |
| | Wet friction | D | B | B | C | A | B |

TABLE 4-continued

| | | Comparative Example 6 | Comparative Example 7 | Comparative Example 8 | Comparative Example 9 | Comparative Example 10 | Comparative Example 11 |
|---|---|---|---|---|---|---|---|
| PVC | Dry friction | A | A | A | A | A | A |
| | Wet friction | D | B | B | C | A | B |

As is clear from the above results, it has been confirmed that the inkjet inks of Examples 1 to 7 containing the pigment dispersions of Examples 1 to 7 according to the present invention, respectively, produce no odors during production and are excellent in all of abrasion resistance, filterability, and resolubility.

On the other hand, the inkjet inks of Comparative Examples 1 to 11 containing the comparative dispersions of Comparative Examples 1 to 11, respectively, were inferior in any of the above characteristics.

Consequently, it has been confirmed that the pigment dispersion for inkjet and the inkjet ink of the present invention can be suitably used for inkjet printing. In addition, it has been confirmed that the pigment dispersion and the ink of the present invention have high abrasion resistance when performing printing on plastic base materials and thus are suitable for printing on plastic films in applications such as packaging and sign display and can also be used for front printing.

The invention claimed is:

1. A pigment dispersion for inkjet comprising:

a dispersant (A);

a pigment (B); and water (C), the dispersant (A) containing a non-cross-linked resin (A1) at least having a structural unit (a1) derived from an acid group-containing monomer, in the resin (A1), the acid groups in the structural unit (a1) being neutralized using a dialkanol tertiary amine with a neutralization rate of 150% to 200% with a neutralization rate when the acid groups are neutralized with a theoretical equivalent as 100%, and the dialkanol tertiary amine being N-(3-aminopropyl) diethanolamine, the dialkanol tertiary amine having two hydroxy groups in a structure and having a boiling point of 150 to 330 °C.

2. The pigment dispersion for inkjet according to claim 1, wherein the resin (A1) has an acid value of 80 to 225 mgKOH/g.

3. The pigment dispersion for inkjet according to claim 1, further comprising a binder (D).

4. The pigment dispersion for inkjet according to claim 1, wherein the pigment dispersion for inkjet is used to prepare an inkjet ink for printing on a plastic base material.

5. An inkjet ink comprising the pigment dispersion for inkjet according to claim 1.

6. A printed product printed with the inkjet ink according to claim 5.

* * * * *